Dec. 18, 1934.   F. KUHN ET AL   1,985,100
THERMOSTAT
Filed Dec. 14, 1931
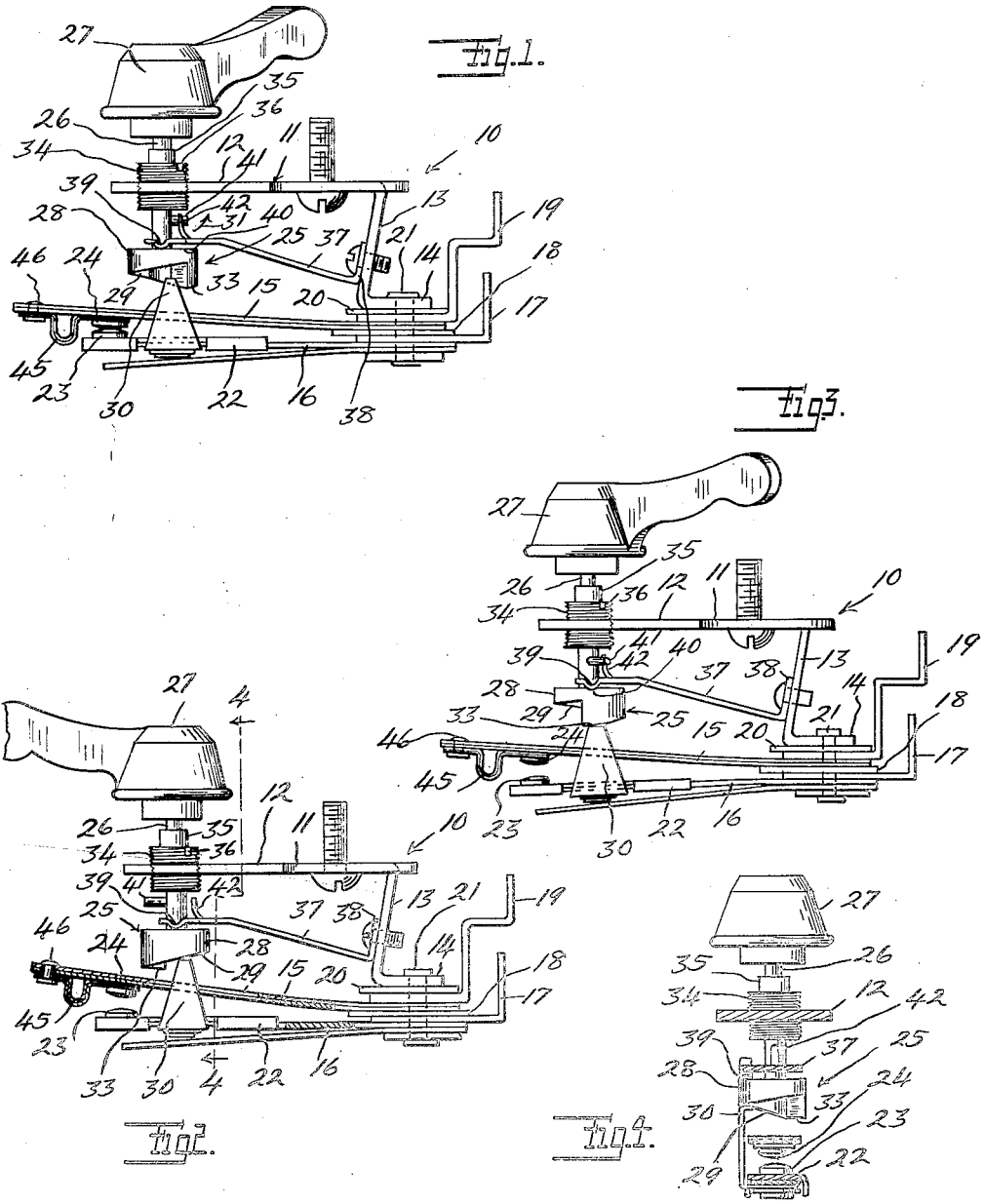
INVENTOR
Frank Kuhn
Laurence H. Thomas
BY Whittemore Hulbert Whittemore
& Belknap
ATTORNEYS Patented Dec. 18, 1934

1,985,100

UNITED STATES PATENT OFFICE 1,985,100

THERMOSTAT

Frank Kuhn, Detroit, and Laurence H. Thomas, Birmingham, Mich., assignors to American Electrical Heater Company, Detroit, Mich., a corporation of Michigan Application December 14, 1931, Serial No. 580,996

6 Claims. (Cl. 200—138)

This invention relates generally to thermostats and refers more particularly to thermostatic switch constructions for controlling electric circuits in accordance with temperature variations.

Although it will be apparent as this description proceeds that the thermostat forming the subject matter of this invention may be utilized in connection with various electrically operated devices where it is desirable to control an electric circuit in dependence upon temperature variations, nevertheless, it finds particular utility when employed in association with electrically heated irons wherein it is desirable to open the circuit to the heating element of the iron at various predetermined temperatures and to frequently maintain the circuit open irrespective of normal temperature changes.

While thermostats as now commercially produced for use in electrically heated irons are usually capable of adjustment for varying the temperature at which the same operates to open the circuit to the heating element, nevertheless, no means has heretofore been provided for maintaining the thermostat in a position wherein the circuit is broken irrespective of normal temperature changes. In order to accomplish this latter result, it has heretofore been the practice to either detach the plug of the current carrying member from its socket or to provide a separate independently operable switch in the circuit. The necessity of detaching the plug of the current carrying member from its socket each time it is desired to discontinue the operation of the heating element is obviously inconvenient and the provision of a separate switch within the circuit not only complicates the heater assembly, but also materially increases the cost of the same.

The present invention contemplates an improved thermostatic switch construction which, in addition to possessing the usual adjusting feature previously set forth, is also capable of maintaining the circuit to the heating element open irrespective of normal temperature changes without the assistance of separate switch means in the circuit or the necessity of detaching the plug of the current carrying member from the socket.

A further advantageous feature of the present invention which contributes materially to improving the construction and operation of the thermostat resides in the provision of a single readily adjustable member fashioned to perform the dual function of regulating the operation of the thermostat to vary the temperature at which the same operates to open the circuit and also to hold the thermostat in a position wherein the circuit to the heating element is maintained open irrespective of normal temperature changes.

Other objects of the present invention will be made more apparent as this description proceeds, especially when considered in connection with the accompanying drawing, wherein:

Figure 1 is a side elevational view of a thermostat constructed in accordance with this invention;

Figure 2 is a view similar to Figure 1 showing the parts of the thermostat in a different position;

Figure 3 is also a side elevational view of the thermostat showing the parts thereof in a position wherein the circuit is maintained open irrespective of normal temperature changes; and Figure 4 is a sectional view taken on the line 4—4 of Figure 3.

Referring now to the drawing, it will be noted that there is illustrated in Figure 1 a thermostatic switch assembly 10 comprising an attaching bracket 11 having a substantially horizontally disposed body portion 12 provided with a depending arm 13 at the rear end thereof terminating in a lateral flange 14. Fastened to the flange 14 of the bracket and extending forwardly therefrom beneath the body portion 12 thereof is a bimetallic thermostatic strip 15 and a cooperating spring metal strip 16. The spring metal strip 16 is disposed below the bimetallic strip 15 and is normally held in spaced relation thereto by means of a terminal member 17 having a portion interposed between the rear ends of said strips and having another portion adapted to be connected to one side of the circuit to the heating element of the device to which the thermostat is adapted to be attached. The portion of the terminal member 17 interposed between the strips is arranged in direct electrical contact with the spring metal strip 16 and is insulated from metallic contact with the thermostatic strip 15 by means of suitable insulating material 18. The thermostatic strip 15 is electrically connected in the circuit aforesaid by means of a second terminal contact member 19 having a portion disposed between the flange 14 on the bracket and rear end of the thermostatic strip 15 in contacting relation with the latter so as to supply electrical energy thereto from the circuit. The terminal member 19 is insulated from the flange 14 on the bracket by means of suitable insulating material 20 interposed between adjacent surfaces of the flange and portion aforesaid of the terminal member 19. As will be observed from Figures 1 to 3, inclusive, all of the aforesaid parts including the insulating material and flange 14 on the bracket are arranged in superposed relation so as to permit clamping the same together by means of a single fastener element 21.

The spring metal strip 16 is formed of a high grade material capable of retaining its resiliency at high temperatures and is reinforced at the free end thereof by means of a substantially channel-shaped section 22 rigidly secured thereto. The channel-shaped section 22 forms an extension of the spring metal strip 16 and is provided at the free end thereof with an upwardly extending contact 23 arranged to engage a similar contact 24 carried by the bimetallic thermostatic strip 15. The construction is such that when the contacts 23 and 24 are in engagement as shown in Figure 1, the circuit to the device (not shown) controlled by the thermostat is established causing the device to be energized by the electrical energy flowing through the circuit.

The thermostatic strip 15 is so constructed and arranged that under increasing temperature conditions, the same deflects laterally upwardly tending to separate the contacts 23 and 24 and thereby break the circuit aforesaid. However, immediate separation of the contacts 23 and 24 upon upward deflection of the thermostatic strip 15 is normally prevented since the spring metal strip 16 is secured under tension in the assembly so as to produce a pressure between the contacts tending to resist separation thereof. In other words, the construction is such that the spring metal strip 16 follows the thermostatic strip during upward deflection thereof under increasing temperature conditions and serves to maintain the desired pressure between the contacts during deflection of the thermostatic strip.

In order to permit separation of the contacts 23 and 24 and thereby open the circuit, we have provided a stop 25 in the path of the spring metal member 16 spaced in such a manner as to intercept movement of the same with the thermostatic element 15 when the deflection of the latter corresponds to a predetermined temperature. The stop 25 is adjustable so as to arrest movement of the spring metal strip 16 with the thermostatic strip 15 at different intervals of deflection of the latter strip and thereby provide for breaking the circuit at different predetermined temperatures. In detail, the stop 25 comprises a vertically extending shaft 26 rotatably mounted upon the body portion 12 of the bracket and having portions extending above and below the body portion aforesaid. The upper end portions of the shaft form a mounting for a suitable handle 27 conveniently located to permit rotation of the shaft while the lower end of the latter has secured thereto a disk or collar 28 having a spiralled bottom surface 29 arranged to engage the upper end of a suitable member 30 fixed to and insulated from the spring metal strip 16.

In the construction as described, the circuit is normally closed when the thermostatic strip is at or approximately at room temperature by reason of the contacts 23 and 24 being in engagement as shown in Figure 1. Assuming that the thermostat is in the position illustrated in this latter figure and that the stop 25 has been adjusted to assume the position thereof shown in Figure 1 wherein maximum clearance is provided between the spiralled surface 28 and member 30, it will be noted that upon a rise in temperature, the thermostatic strip 15 will be deflected upwardly tending to move away from the spring metal strip 16. Owing to the construction heretofore set forth, however, the spring metal strip 16 moves upwardly with the thermostatic strip 15 until the member 30 strikes the adjacent surface of the spiralled disk 28 at which time further upward movement of the spring member 16 is prevented and continued movement of the thermostatic strip 15 causes a separation of the contacts as shown in Figure 2. It is to be noted, however, that with the adjustment of the stop illustrated in Figure 1, separation of the contacts will be effected only upon a predetermined maximum rise in temperature and accordingly, in the event it is desired to reduce the temperature at which the thermostat functions to separate the contacts or break the circuit, the disk 28 is merely rotated in the direction of the arrow 31. Rotation of the disk 28 in the aforesaid direction progressively decreases the space between the spiralled surface and the upper end of the member 30 and as a consequence, varies the degree of deflection of the thermostatic strip 15 necessary to separate the contacts or in other words, provides for breaking the circuit under different temperature changes. The provision of an adjustable member having a spiralled surface of the type previously described, permits securing accurate adjustments of the thermostat since it provides for gradually varying the degree of deflection of the thermostatic strip 15 to separate the contacts 23 and 24.

As previously stated, it is one of the principal objects of the present invention to utilize the adjustable stop 25 for actuating the thermostat to maintain the contacts 23 and 24 separated under normal temperature variations. The foregoing is accomplished herein by accurately positioning the rotatable disk relative to the upper end of the member 30 so that in the normal position of the thermostat shown in Figure 1, the peak portion 33 of the spiralled surface assumes a position below the upper edge of the member 30. As a consequence, rotation of the disk 28 throughout approximately 180° from the position thereof shown in Figure 1 causes the peak portion 33 of the spiral to engage the member 30 and move the same, together with the spring metal strip 16, downwardly relative to the thermostatic strip 15. As shown particularly in Figure 3, downward movement of the spring metal strip 16 relative to the thermostatic strip 15 causes a separation of the contacts 23 and 24. The portion 33 of the disk member is so developed as to permit regulating the distance the contacts are adapted to be separated and thereby provide for downward deflection of the thermostatic strip 15 to close the circuit in the event the temperature falls below the predetermined normal temperature at which the thermostat is designed to operate. However, it is to be noted that when the disk is moved to the position thereof shown in Figure 3 wherein the actual peak of the spiralled surface is in engagement with the member 30, the space between the cooperating contacts 23 and 24 is such as to prevent closing the circuit by downward deflection of the thermostatic strip 15 under normal temperature conditions. Accordingly, when the actual peak portion of the spiralled surface is brought into engagement with the member 30, the thermostat is moved to a position wherein the contacts 23 and 24 are permanently separated.

In order to accurately position the disk 28 relative to the member 30, the rotatable shaft 26 is journaled within a nipple 34 which in turn is threadedly secured to the body portion of the bracket 12. The shaft 26 is provided with a suitable collar 35 engageable with the upper end of the nipple to restrict downward movement of the shaft relative to the latter and the nipple is formed with suitable slots 36 therein for engagement with a wrench to permit the same to be rotatably adjusted relative to the bracket and thereby provide for accurately determining the elevation of the disk 28 relative to the member 30. Upward displacement of the shaft 26 relative to the nipple is yieldably resisted by means of a spring clip 37 having one end rigidly secured to the arm 13 of the bracket as at 38 and having the opposite end forked to straddle the shaft 26 and exert a pressure on the upper surface of the disk 28. One of the forked ends of the strip 37 is slightly bent as at 39 to form a detent for engaging a suitable recess 40 in the upper surface of the disk member directly opposite the high point of the spiral so as to indicate the relative adjustment of the spiral and member 30. Rotation of the shaft 26 by the handle 27 to adjust the disk 28, however, is positively restricted in both directions by means of a suitable pin 41 secured to the shaft and a projection 42 extending upwardly from the clip 37 in the path of travel of the pin 41. The pin 41 is so positioned upon the shaft 26 as to engage the projection 42 in both of the extreme positions of adjustment aforesaid of the disk 28.

In order to simplify the above description, the contact member 24 has been heretofore described as carried by the thermostatic strip 15. However, it is to be noted that this contact is actually secured to the free end of a second thermostatic strip 45 having the opposite end fixed to the free end of the strip 15 by the fastener element 46. The construction of the strip 45 is such that the same deflects oppositely to the strip 15 under similar temperature changes and furthermore, offers a greater resistance to the flow of current therethrough causing the same to be subjected to higher temperatures than the strip 15 during the passage of current therethrough. By reason of the above, the strip 45 provides for obtaining a slight lag in the separation of the contacts 23 and 24, with the result that the frequency of operation of the thermostat is reduced to the minimum. In this connection, it is to be understood that in the event sensitive thermostatic operation is desired, the strip 45 may be eliminated and the contact 24 secured directly to the thermostatic strip 15.

Certain features of construction described and illustrated but not claimed herein are subject matter of our co-pending applications for patents, Serial No. 597,170, filed February 15, 1932, and Serial No. 751,594, filed November 5, 1934.

What we claim as our invention is:

1. A thermostatic switch comprising, a thermostatic element movable laterally in accordance with temperature conditions, a second element adjacent the element aforesaid and having a laterally extending projection, cooperating contacts on the respective elements arranged in engagement with each other in the normal position of said elements, a rotatable member having an inclined portion engageable with said projection for moving said second element relative to the thermostatic element to separate the contacts irrespective of temperature conditions, and means for rotating said member to permit engaging different portions of said inclined surface with the projection and thereby permit engagement of said contacts at all temperatures below a predetermined temperature.

2. A thermostatic switch comprising a thermostatic strip supported at one end and adapted to have the free end thereof move laterally under temperature changes, a contact operatively connected to move laterally with said thermostatic strip, a second cooperating contact, a follower strip mounted to urge said second contact into engagement with said first contact, a handle rotatable through less than a complete revolution, a cam connected to said handle and having an inclined portion adapted to form a variable stop for engaging said follower strip thereby regulating the temperature at which said contacts automatically separate in accordance with the position of said handle, said cam also having another portion adapted when said handle is in an extreme position to positively separate said contacts and prevent automatic closing of the same under any normal temperature.

3. A thermostatic switch comprising a thermostatic strip supported at one end and adapted to have the free end thereof move laterally upward under rising temperature changes, a contact operatively connected to move laterally with said thermostatic strip, a second cooperating contact, a follower strip mounted to urge said second contact upwardly into engagement with said first contact, a handle above both of said strips rotatable about a substantially vertical axis, a cam connected to said handle having a spirally inclined surface adapted to engage said following strip to regulate the temperature at which said contacts automatically separate, said cam also having a portion adapted to engage said follower strip when said handle is in an extreme position and thereby positively separate said contacts under all normal temperature conditions.

4. A thermostatic switch comprising a bimetallic thermostatic strip supported at one end and adapted to have the free end thereof move laterally under temperature changes, a contact operatively connected to said thermostatic strip to be movable thereby, a second cooperating contact, a follower strip mounted to urge said second contact into engagement with said first contact, a handle rotatable through less than a complete revolution and means operatively connected to said handle forming a variable stop for engaging said follower strip thereby regulating the temperature at which said contacts automatically separate in accordance with the position of said handle, said means being adapted when said handle is in an extreme position to positively separate said contacts and prevent automatic closing of the same under any normal temperature.

5. A thermostatic switch comprising a thermostatic strip supported at one end and adapted to have the free end thereof move laterally under temperature changes, a contact operatively connected to said thermostatic strip to be moved thereby, a second cooperating contact, means for urging said second contact into engagement with said first contact, a rotatable handle, and means operatively connecting said rotatable handle and said second contact for variably adjusting the second contact to regulate the temperature at which said contacts automatically separate in accordance with the rotatable position of said handle, said means being adapted when said handle is in an extreme position of rotation to positively separate said contacts and prevent automatic closing of the same under any normal temperature.

6. A thermostatic switch comprising a thermostatic strip supported at one end and adapted to have the free end thereof move laterally under temperature changes, a contact operatively connected to said thermostatic strip to be moved thereby, a second cooperating contact, means for urging said second contact into engagement with said first contact, a rotatable handle, means operatively connected to said rotatable handle forming a variable stop for said second contact thereby regulating the temperature at which said contacts automatically separate in accordance with the position of said handle, said means being adapted when said handle is in an extreme position to positively separate said contacts and prevent automatic closing of the same under any normal temperature.

FRANK KUHN.
LAURENCE H. THOMAS.